(12) United States Patent
Dash et al.

(10) Patent No.: US 9,788,241 B2
(45) Date of Patent: Oct. 10, 2017

(54) DEVICE AND METHOD FOR USER ORIGINATED MULTIPLE CONNECTION MANAGEMENT TRANSACTIONS VIA CIRCUIT SWITCHED FALLBACK

(71) Applicant: Intel IP Corporation, Santa Clara, CA (US)

(72) Inventors: Deepak Dash, Khordha (IN); Nitin Kuppelur, Bangalore (IN); Nitin Gowda Basavarajappa, Breinigsville, PA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/975,884

(22) Filed: Dec. 21, 2015

(65) Prior Publication Data

US 2017/0181042 A1    Jun. 22, 2017

(51) Int. Cl.
*H04W 36/00* (2009.01)
*H04W 36/14* (2009.01)

(52) U.S. Cl.
CPC ....... *H04W 36/0022* (2013.01); *H04W 36/14* (2013.01)

(58) Field of Classification Search
CPC .......................... H04W 36/14; H04W 36/0022
USPC ............... 455/435.2, 436, 439, 442; 380/272
See application file for complete search history.

(56) References Cited

U.S. PATENT DOCUMENTS

| | | | |
|---|---|---|---|
| 2012/0093008 A1* | 4/2012 | Diachina | H04L 43/0876 370/252 |
| 2013/0329567 A1* | 12/2013 | Mathias | H04W 36/30 370/242 |
| 2015/0043533 A1* | 2/2015 | Kim | H04W 48/20 370/331 |
| 2015/0257057 A1* | 9/2015 | Su | H04W 56/0015 370/329 |
| 2015/0365856 A1* | 12/2015 | Krishnamoorthy | H04W 76/046 370/331 |
| 2015/0381291 A1* | 12/2015 | Mahajan | H04B 15/00 370/252 |

(Continued)

FOREIGN PATENT DOCUMENTS

| | | |
|---|---|---|
| CN | 103024846 A | 4/2013 |
| EP | 2911455 A1 | 8/2015 |
| WO | 2014101530 A1 | 7/2014 |

OTHER PUBLICATIONS

Yi-Bing Lin et al., "Performance Evaluation of LTE eSRVCC with Limited Access Transfers", IEEE Transactions on Wireless Communications, May 2014, pp. 2402-2411, vol. 13, No. 5, IEEE.

(Continued)

*Primary Examiner* — Inder Mehra
(74) *Attorney, Agent, or Firm* — Viering, Jentschura & Partner mbB (57) ABSTRACT

A communication device and a method to perform a switch from a first radio access technology (RAT) to a second RAT consisting of detecting multiple pending transactions to be conducted on the second RAT, switching from the first RAT to the second RAT, conducting the multiple pending transactions on the second RAT, and implementing a restriction on switching back to the first RAT for at least the duration while the multiple transactions on the second RAT is taking place.

20 Claims, 6 Drawing Sheets

(56) References Cited

U.S. PATENT DOCUMENTS

2016/0374104 A1* 12/2016 Watfa ............... H04W 36/0011

OTHER PUBLICATIONS

Ren-Huang Liou et al, "Performance of CS Fallback for Long Term Evolution Mobile Network", IEEE Transactions on Vehicular Technology, Oct. 2014, pp. 3977-3984, vol. 63, No. 8, IEEE.
"3rd Generation Partnership Project; Technical Specification Group Services and System Aspects; Circuit Switched (CS) fallback in Evolved Packet System (EPS); Stage 2 (Release 13)", Technical Specification, Dec. 2015, 3GPP TS 23.272 V13.2.0, 3GPP, France.
The Extended European Search Report based on Application No. 16198434.9 (12 Pages) dated Jun. 22, 2017 (Reference Purpose Only).

* cited by examiner

602 Detect a plurality of pending transactions to be conducted on a second RAT when camped on a first RAT 604 Switch from the first RAT to the second RAT 606 Conduct the plurality of pending transactions on the second RAT 608 Implement a restriction on switching back to the first RAT for at least the duration of said conducting the plurality of pending transactions on the second RAT

DEVICE AND METHOD FOR USER ORIGINATED MULTIPLE CONNECTION MANAGEMENT TRANSACTIONS VIA CIRCUIT SWITCHED FALLBACK

TECHNICAL FIELD

Various embodiments relate generally to circuit switched fallback from a first radio access technology network (e.g. long term evolution) to a second radio access technology network when conducting multiple transactions on the second radio access technology network.

BACKGROUND

The Third Generation Partnership Project (3GPP) Release 8 specifies for circuit switched fallback (CSFB) when a circuit managed (CM) transmission is delivered to a device camped on the long term evolution (LTE) network since LTE is a packet switched (PS) data based technology. By using CSFB, the device may select to a third generation (3G) radio access technology (RAT), such as the Universal Mobile Telecommunications System (UMTS), or a second generation (2G) RAT, such as the Global System for Mobile Communications (GSM), in order to receive the incoming CM transmission. In other words, when an LTE device is used to make or receive a CM transmission such as a voice call, Supplementary Service (SS) transaction, Unstructured Supplementary Service Data (USSD) transaction, the LTE device will fall back to a 3G or 2G RAT (collectively, hereinafter, referred to as a "legacy RAT") in order to complete the CM transmission.

When a CM transaction is supported by CSFB, the LTE device (i.e. mobile terminal, or user element (UE)) will switch from the LTE network to the legacy RAT network where the transaction can be performed. This applies to non-call related CM transactions as well, such as an Supplementary Service (SS) transactions, Unstructured Supplementary Service Data (USSD) transactions, etc. Since most of these non-call related transactions are short in duration and may arrive in frequent intervals, the UE will fall back from the LTE network to the legacy RAT network in order to receive the transaction, camp back on the LTE network upon completion of the transaction, fall back to the legacy RAT network for the next transaction, etc. This leads to a high load on LTE and legacy RAT networks by performing repetitive inter-RAT (IRAT) handover or redirection procedure involving the movement of the UE from LTE network to a legacy RAT network and vice versa. In addition to the high loads imposed on the networks, this process leads to increased power consumption in the UE and a deterioration in the end user experience as the high number of IRAT handovers or redirections will consume larger amounts of time.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDM A), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

Figure 1:
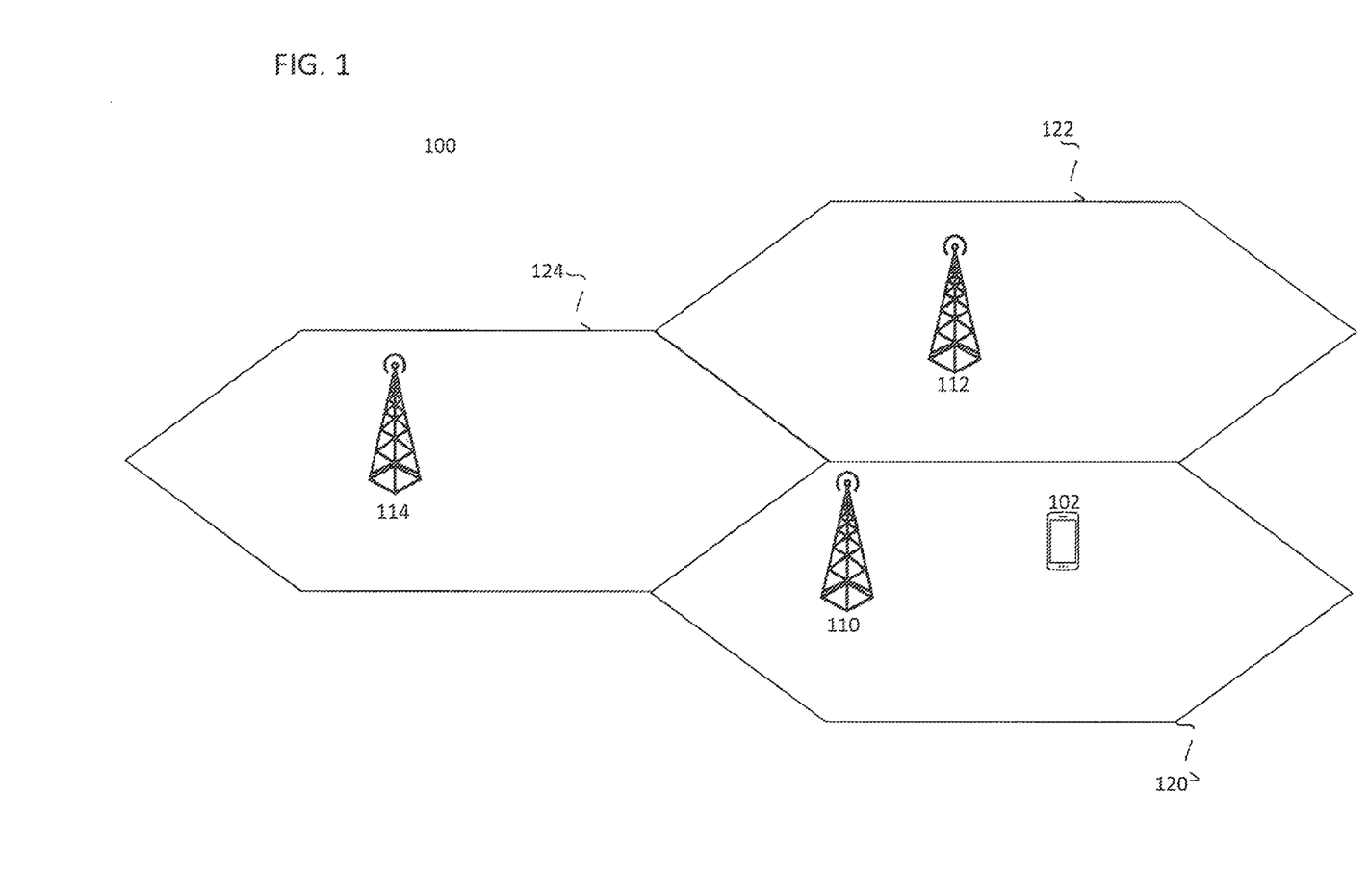
FIG. 1 shows an example of communication network in an aspect of this disclosure.

FIG. 1 shows mobile communication network 100. Mobile communication network may be include at least mobile terminal 102, base stations 110-114 and coverage regions 120-124 corresponding to base station 110, 112, and 114, respectively. It is appreciated that mobile communication network 100 is exemplary in nature and may thus be simplified for purposes of explanation.

Base stations 110-114 may each be associated with a radio access section of mobile communication 100, i.e. the Radio Access Network (RAN) of mobile communication network 100, e.g. the Evolved Universal Terrestrial Radio Access Network (EUTRAN). Base stations 110-114 may thus act as an interface between the RAN of mobile communication network 100 and an underlying core network of mobile communication network 100, and may allow any proximate mobile terminals, e.g. mobile terminal 102, to exchange data with the core network of mobile communication network 100 and any further networks connected thereto.

Each of base stations 110-114 may respectively provide mobile communication coverage to coverage regions 120-124, which may correspond to a single cell (i.e. sector) of a respective one of base stations 110-114 or may be composed of multiple cells (i.e. sectors) of a respective one of base station 110-114. As shown in FIG. 1, mobile terminal 102 may be physically located within coverage regions 120 of base station 110. It is appreciated that although coverage regions 120-124 are depicted as having distinct boundaries, it is understood that one or more of coverage regions 120-124 may overlap, and accordingly there may exist geographical regions served by two or more of base stations 110-114.

As previously indicated, there may exist geographic overlap between coverage regions 120-124. For example, coverage regions 120 and 122 may substantially overlap, and accordingly mobile terminal 102 may receive wireless transmissions from both of base stations 110 and 112.

Communication Network 100 may be configured in accordance with the network architecture of any one of, or any combination of, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. Accordingly, base stations 110-114 may be configured to provide an interface for communication devices, such as mobile element 102, to connect with any of the aforementioned network architectures.

For example, base station 110 may be an evolved Node B (eNB) providing mobile element 102 with an interface to connect to an LTE network. In this case, base station 110 serves as the interface with the mobile management entity (MME) for the mobile terminal 102. The MME is the key control-node for the LTE access-network. Base station 112 may serve as a base transceiver station (BTS) or Node B providing mobile element 102 with an interface to connect to a GSM or UMTS network. In this case, base station 112 serves as the interface with the Mobile Switching Center Server (MSS), which is a 2G or 3G core network element which controls the network switching subsystem elements. Mobile element 102 may be camped on base station 110 (serving as an eNB in this example) and may be in idle mode. Alternatively, the mobile terminal 102 may be in connected mode and be actively receiving LTE data services. If a CM transmission is made to the mobile element 102, it will have to fall back to a legacy network in order to receive the CM transmission. In this case, mobile terminal 102 may fall back to the 2G or 3G network supported by base station 112 (serving as a BTS or Node B in this example).

Figure 2:
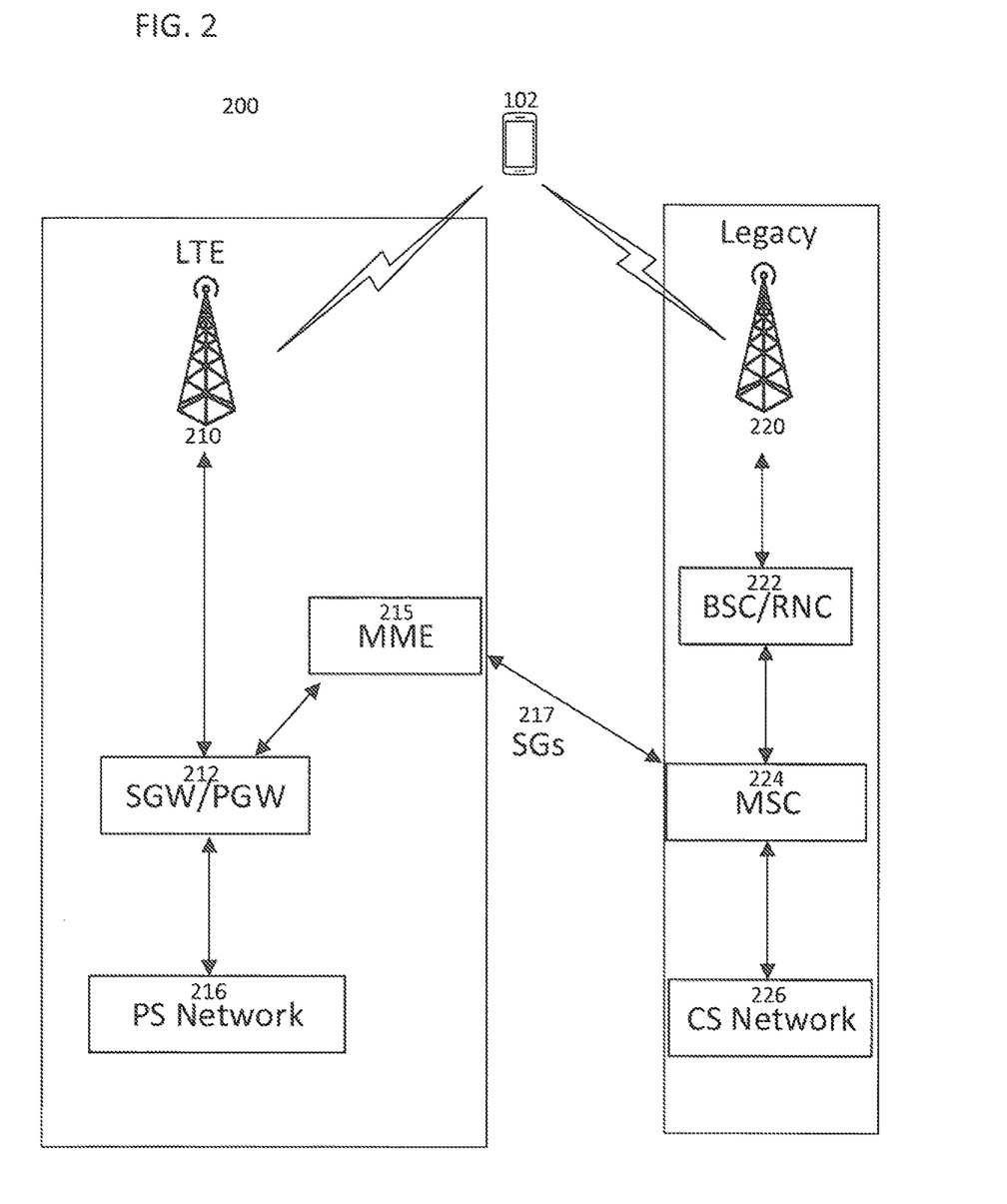
FIG. 2 shows an example of a communication network structure in an aspect of this disclosure.

FIG. 2 shows an example of a network structure 200 in an aspect of this disclosure. It is appreciated that network structure 200 is exemplary in nature and may thus be simplified for purposes of explanation.

Mobile element 102 is a device that is capable of operating on both the LTE and a Legacy RAT, and therefore, it is capable of CSFB.

The legacy radio access network (RAN) may consist of either a 2G (e.g. GSM) or a 3G (e.g. UMTS) RAT. In either case, base station 220 is configured to operate with the respective RAT, e.g. base station 220 is a Node B for UMTS or base station 220 is a base station transceiver station (BTS) for GSM. The Base Station Controller (BSC) or the Radio Network Controller (RNC) (BSC/RNC) 222 are the governing elements in the GSM and UMTS RANs, respectively, and are responsible for controlling the base stations that are connected to it. The Mobile Switching Center (MSC) 224 is the primary service delivery node for legacy networks and is responsible for routing voice calls, text messages, etc. in addition to other CM services. It provides the interface to the CM network (i.e. GSM or UMTS) 226.

In the LTE RAN, the base station 210 may be an eNB. The Serving Gateway (SGW) and the packet data network gateway (PGW) (collectively, SGW/PGW) 212 serve as the interface to the packet switch (PS) network 216. The SGW routes and forwards user data packets in addition to acting as a mobility anchor during inter-eNB handovers and as the anchor for mobility between inter-RAT handovers, e.g. LTE to either GSM or UMTS. The PGW provides connectivity from the mobile terminal 102 to external packet data networks. The SGW/PGW 212 communicate with the Mobile Management Entity (MME) 215, which is the key control node for the LTE RAN. The SGs interface 217 connects the MME 215 from the LTE RAN to the MSC 224 of the legacy network.

When the mobile terminal 102 capable of CSFB is turned on, it registers in both networks, the LTE and the legacy network. Whenever a Mobile originated outgoing CM transmission, e.g. SS or USSD, is to be made, the mobile terminal 102 is handed over to a legacy network assuming it provides an overlapping coverage with the LTE cell that the mobile terminal is camped on.

When the Mobile originated CM transmission, e.g. SS or USSD service request is to be made, the Mobile Terminal 102 will send an Extended Service Request message to MME 215, which then notifies the eNB 210 to transfer the Mobile terminal 102 to the legacy network 226 in order to perform the SS or USSD procedure. In order to enable fast handover or redirection (important note: for purposes of this disclosure, the term "handover" is meant to represent handover procedures and/or redirection procedure based on the network capability/implementation) to the legacy network, when a CSFB request is made, the legacy network needs to know the location of the mobile terminal. To account for this, the MME 215 tracks the location of the user in the LTE network continuously provides the location information to the legacy MSC 224 using the SGs interface 217. The Tracking Area Update (TAU) mechanism updates the location of the mobile terminal 102 within the network. The TAU mechanism is the LTE counter-type of the Location Area Update (LAU) procedure, which provides the location of mobile terminal 102 in the GSM and UMTS networks.

Figure 3:
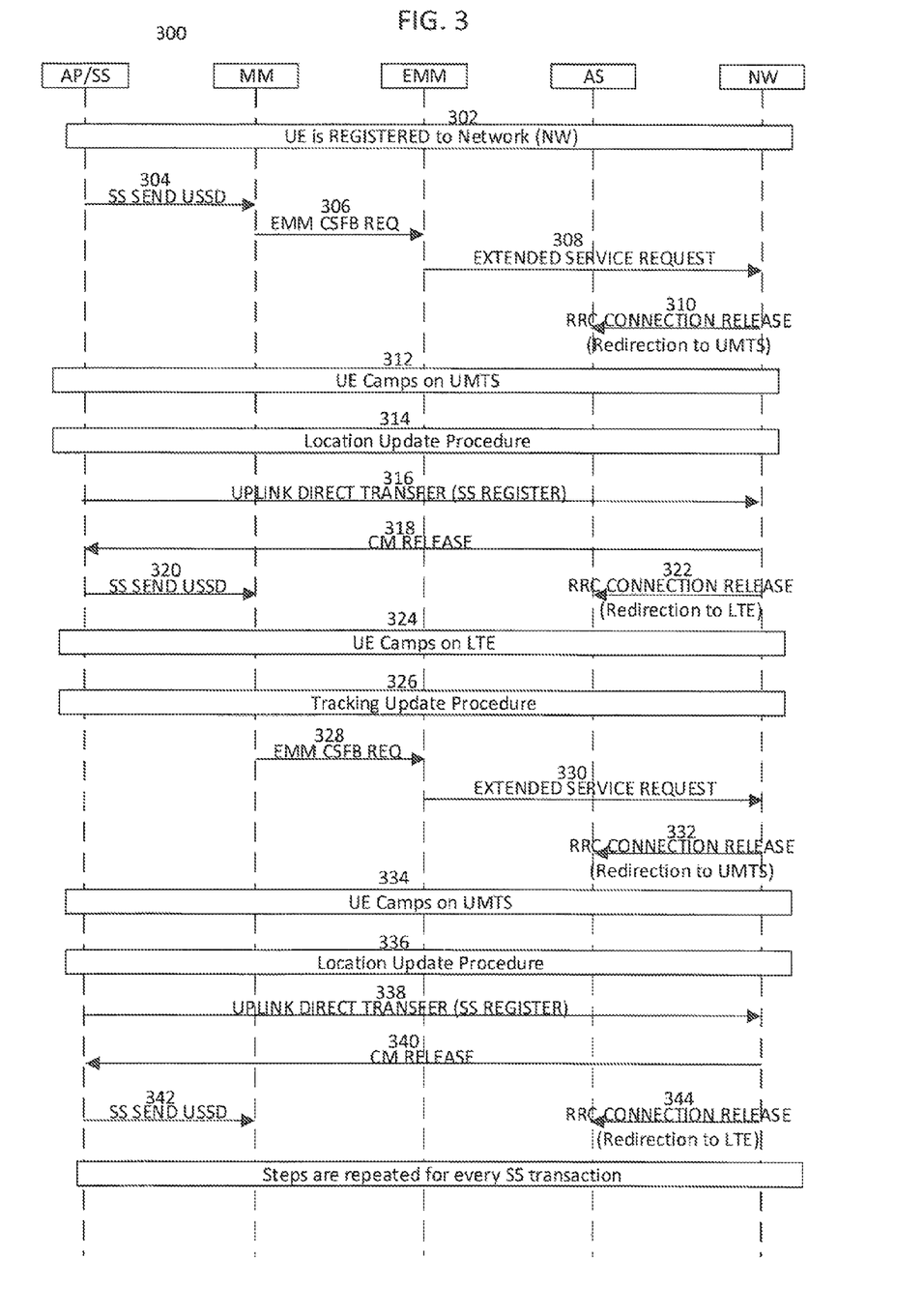
FIG. 3 shows an exemplary message sequence chart (MSC) for the current implementation of CSFB in an aspect of this disclosure.

FIG. 3 shows an exemplary message sequence chart (MSC) 300 showing a problematic current implementation in CSFB. It is appreciated that MSC 300 is exemplary in nature and may thus be simplified for purposes of explanation. In this example, the UE will be sending USSD message, but the following may apply to sending other types of data through CM transactions and also in the case where a plurality of CM transactions are waiting to be received.

In MSC 300, the application (AP) and Supplementary Service (SS) (AP/SS) layer, the Mobility Management (MM) layer, the EPS Mobility Management (EMM), and the Access Stratum (AS) layer are all protocol layers on the user element (UE). The MM layer and the EMM layer are both part of the Non-Access Stratum (NAS) protocol layer on the UE.

Once the UE is powered on, it will register to the network (NW) 302. A UE capable of CSFB will register with the LTE NW and any available legacy NW, such as UMTS NW. While camped on the LTE NW, the UE may have a series of USSD messages to send and/or receive.

The AP/SS layer sends the USSD to the MM layer in 304. The MM layer then sends a CSFB request to the EMM in 306. The EMM sends an extended service request to the network (NW) in 308. The NW responds by sending a radio resource control (RRC) connection release in 310, at which point the UE is redirected to a legacy RAT, which in this example, is UMTS. Thereafter, the UE camps on the UMTS 312 and performs a location update procedure 314 in order to keep the network informed of its location for any future IRAT handover. In 316-318, the UE completes the CM transaction, i.e. submission of the USSD. While there may be more pending transactions waiting to be complete on the UMTS RAT as demonstrated by 320, the NW issues an RRC connection release 322 upon completion of the first CM transaction. This will trigger the UE to camps back on the LTE 324, even though there is a second USSD transaction (320) pending.

After performing the Tracking Update Procedure (i.e. TAU procedure) 326, the MM layer of the UE will forward a CSFB request 328 to the EMM, which will send an extended service request 330 to the NW. The NW will respond with a RRC connection release 332, redirecting the UE back to UMTS. The UE will camp on the UMTS 334 and perform a Location Update Procedure 336. In 338-340, the UE will complete the second USSD transaction, at which point the NW will issue an RRC connection release 344 directing the UE back to the LTE NW, even though there is a third USSD transaction 342 pending. This process is repeated for every CM transaction to be conducted on the legacy RAT (in the above example, UMTS) network. This process of jumping back and forth from the LTE and the legacy RAT while there are pending transactions on the legacy RAT is power intensive and of great inconvenience to the end user.

A further example describing the disclosure is detailed in the following scenario.

A UE is powered on and camps on LTE and is attached to the network successfully. The user starts a USSD menu download, i.e. multiple USSD transactions, on the UE. To perform the first USSD transaction, the UE starts the CSFB procedure and falls back to the legacy RAT network. The MM of the UE performs the registration (for a legacy RAT, the location area update procedure) and completes the first USSD transaction. Upon completion of the transaction, the UE is redirected back to the LTE after a connection release from the network, even though the user may have selected another menu item from the USSD menu, i.e. starts a second USSD transaction. In order to perform the second transaction, the UE will start the CSFB procedure and fall back to the legacy RAT network again. This process is repeated over and over again for each pending USSD transaction.

In order to avoid the continuous jumping back and forth between the LTE and legacy RAT networks while there are pending transactions to be conducted on the legacy RAT, the MM layer will get information when a session of transactions are to be conducted on the legacy RAT and will retain the connection on the legacy RAT, i.e. restrict the switching back to LTE, i.e. delay the reselection back to LTE.

Figure 4:
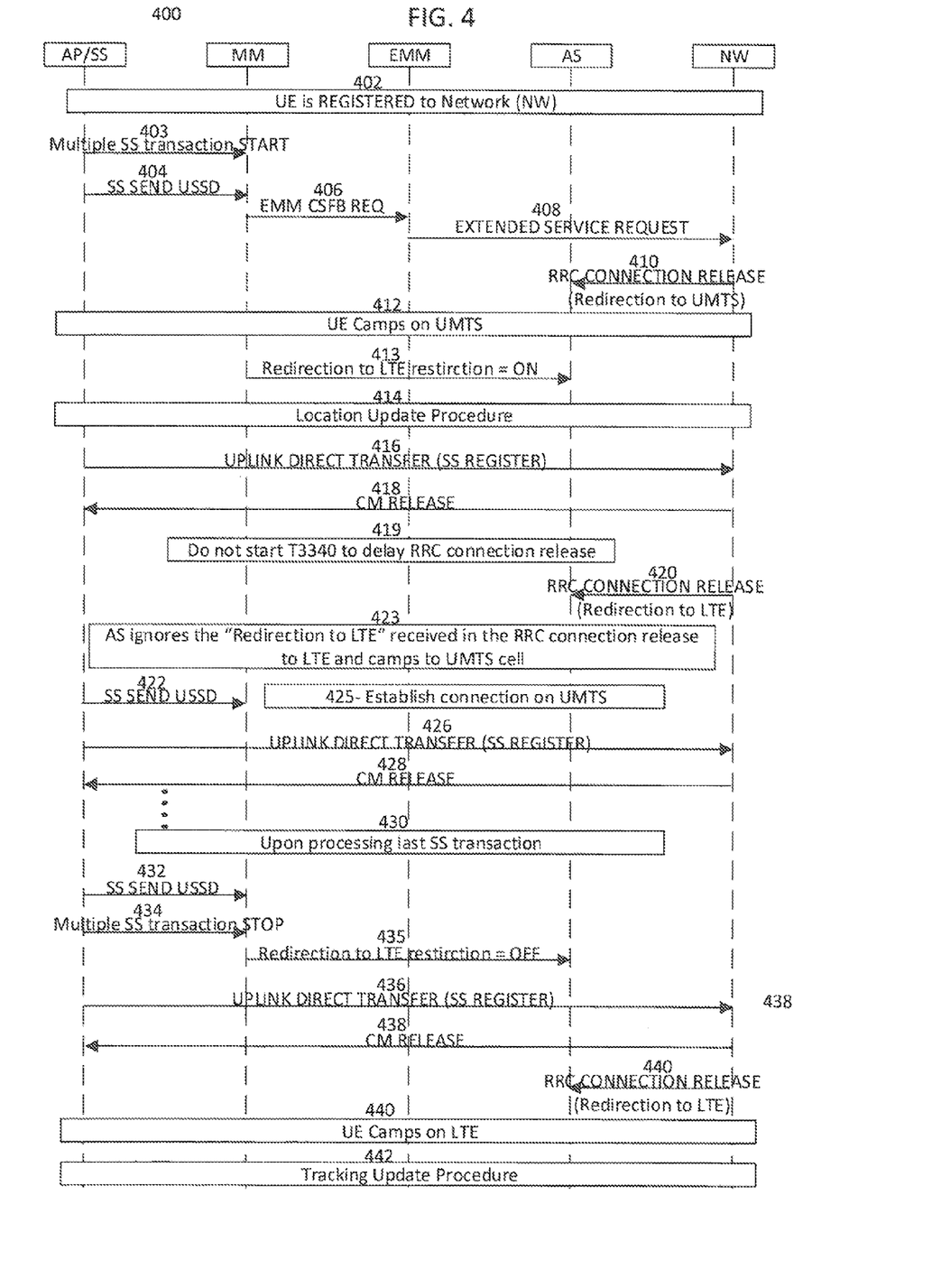
FIG. 4 shows an exemplary MSC for CSFB in an aspect of this disclosure.

FIG. 4 shows an exemplary message sequence chart (MSC) 400 showing an aspect of this disclosure. It is appreciated that MSC 400 is exemplary in nature and may thus be simplified for purposes of explanation. In this example, the UE will be sending USSD messages, but the following disclosure may apply to sending other types of data through CM transactions and also to receiving a plurality of CM transactions within a short period of time.

In MSC 400, the application (AP) and Supplementary Service (SS) (AP/SS) layer, the Mobility Management (MM) layer, the EPS Mobility Management (EMM), and the Access Stratum (AS) layer are all protocol layers on the user element (UE). The MM layer and the EMM layer are both part of the Non-Access Stratum (NAS) protocol layer on the UE. The network (NW) comprises the overall network, which may consist of networks different RATs, such as the LTE NW, the GSM NW, the UMTS NW, etc.

Once the UE is powered on, it will register to the network (NW) 402. A UE capable of CSFB will register with the LTE NW and any available legacy NW, such as UMTS RAT network, which will be used in this example. Alternatively, the UE may also register with a GSM RAT network. While camped on the LTE NW, the UE may have a series of USSD messages waiting to be sent and/or received.

The AP/SS layer will mark that there are multiple transactions to be conducted on the non-LTE RAT 403. In this example, the multiple SS transactions will be sending information by USSD, but this disclosure also applies to any other forms of circuit managed (CM) transactions (e.g. SS, USSD, etc.) as well as receiving a series of CM transactions.

The AP/SS layer sends the USSD to the MM layer in 404. The MM layer then sends a CSFB request to the EMM in 406. The EMM sends an extended service request to the network (NW) in 408. The NW responds by sending a radio resource control (RRC) connection release in 410, at which point the UE is redirected to a legacy RAT, which in this example, is UMTS. Thereafter, the UE camps on the UMTS 412.

Once the UE is camped on UMTS, since there was an indication of multiple transactions to conduct 403, the MM layer will instruct the Access Stratum (AS) layer that a restriction to redirect to the LTE network is on 413. In other words, the MM implements a restriction to switch back to the LTE network.

After imposing the restriction, the UE performs a location update procedure 414 in order to keep the network informed of its location for any future IRAT handover. In 416-418, the UE completes the first CM transaction, i.e. submission of the first USSD. After the first USSD submission is complete, the UE will not start the timer (e.g. T3340) in order to delay the RRC connection release 419. In 420, the network (NW) issues the RRC connection release to redirect back to the LTE, but the AS ignores the redirection to LTE received in the RRC connection release and camps to the UMTS cell 423 since the redirection to LTE restriction is on (refer to 413). In this manner, the legacy AS will restrict the redirection and reselection back to LTE until the NAS-MM lifts the restriction.

The second USSD transaction 422 can then immediately take place since the UE is still on the UMTS and is complete in 426-428. Any further pending SS transactions (i.e. the USSD transactions) can be completed as well. Upon processing the last SS transaction (i.e. the last USSD sent from the AP/SS layer) 430, shown in FIG. 4 as 432, the AP/SS layer indicates to the MM layer a multiple transactions stop 434, i.e. there are no more pending transactions. The MM layer lifts the restriction on the redirection to LTE 435, after which point the final USSD (i.e. SS transaction) is completed in 436-438. Since the restriction on the redirection to LTE has been lifted, upon receiving the RRC Connection Release 440 sent by the network, the AS will process the Redirection to LTE if provided by the network, at which point the UE camps back on LTE 440 and performs the tracking update procedure 442.

The aspect of the disclosure proposed above avoids the multiple ping-pong between the LTE network and the legacy RAT network by having a synchronization between the internal modules (i.e. protocol layers: Application, Non-Access Stratum (NAS) Control Management, NAS Mobility Management (MM), and the Access Stratum (AS)) of the UE.

This disclosure implements of a mechanism by which Application and Control Management layers (like Supplementary Service (SS) and Unstructured Supplementary Service Data (USSD) modules) can create a session before starting a procedure involving multiple transactions and closing the session at the end of the procedure. For example, the session may look as follows: a USSD menu download triggers the selecting of a menu item, which triggers a new menu display, and then selecting the required item. The new session is created on the UE side when first sending the USSD string to get the menu and is closed when the user selects the final option and ends the procedure.

The start of such a procedure is indicated by the Application layer to the MM layer so that the MM layer starts the CSFB only at the start of the first transaction. The MM layer commands the AS to remain camped on the legacy RAT (GSM or UMTS) network until all the transactions are complete by avoiding reselection to LTE even if the network (e.g. EUTRAN) redirects the UE to LTE during connection time to the legacy RAT. MM can delay the release of the connection by not starting the requisite timer. The MM will forwards the information to the Access Stratum (AS) so that the AS avoids the scenario of reselection to LTE (i.e. when the network initiates the connection release).

When the Application layer indicates that the session is over, i.e. all the transactions conducted on the legacy RAT are completed, the MM layer can start the requisite timer, at which point the MM ceases the hold on the legacy RAT (i.e. the MM lifts the restriction on redirecting to LTE). The connection to the legacy RAT will be released on expiry of the timer.

It another aspect of this disclosure, the UE may be further configured to divide the multiple pending transactions to be conducted on the legacy RAT into subsets. In this manner, the UE can conduct at least one of the subsets to completion of the legacy RAT, switch back to the LTE to conduct at least one transaction, then perform a CSFB back to the legacy RAT to conduct another subset of the transactions, etc. For example, there may be twenty transactions (transmissions and/or receptions) to conduct on the legacy RAT, and the UE may divide the transactions into two subsets of ten transactions each. The UE can then conduct the ten transactions of the first subset without interruption on the legacy RAT, switch back to the LTE to conduct a transaction on LTE (e.g. any packet switch (PS) transaction), and then fall back to the legacy RAT to conduct the second subset of ten transactions.

Figure 5:
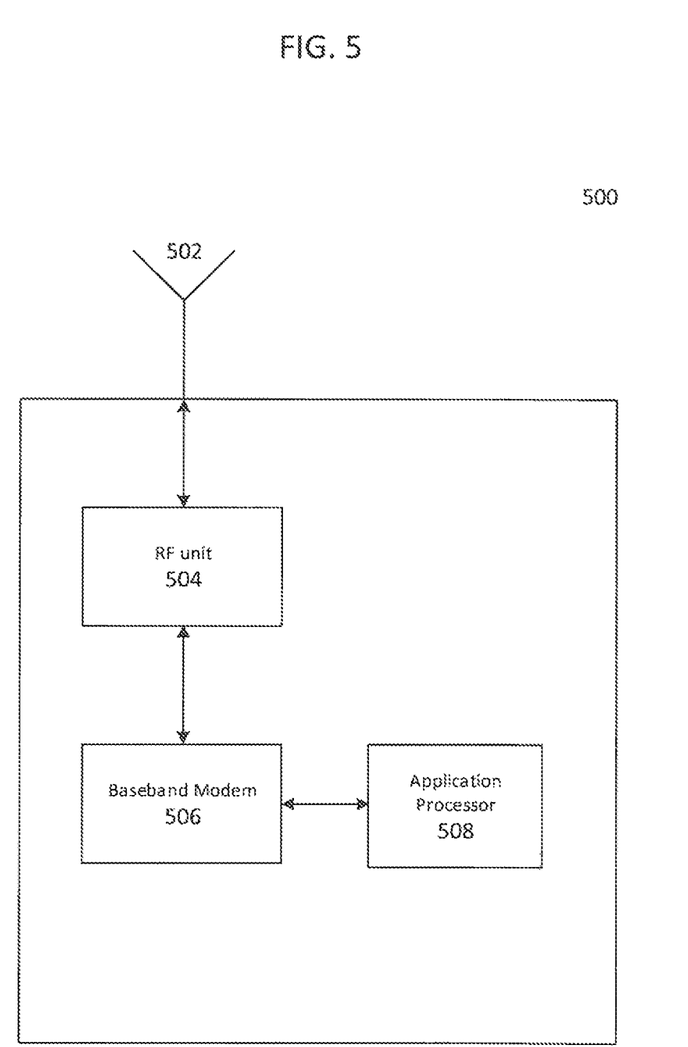
FIG. 5 shows an example of a communication device in an aspect of this disclosure.

FIG. 5 shows a schematic diagram of a mobile terminal 500 according to one aspect of this disclosure. Mobile terminal 500 is configured to expedite CSFB call setup time upon failure of CSFB to the target RAT. It is appreciated that mobile terminal 500 is exemplary in nature and may thus be simplified for purposes of explanation.

As shown in FIG. 5, mobile terminal 500 may include an antenna 502, radio frequency (RF) unit 504 (i.e. RF transceiver), baseband modem 506, and application processor 508. As shown in FIG. 5, these components may be implemented as separate components. However, as depicted in FIG. 5, it is appreciated that the configuration of mobile terminal 500 is for purposes of explanation, and accordingly, one or more of the aforementioned components of mobile terminal 500 may be integrated into a single equivalent component or divided into multiple components with collective equivalence. It is also appreciated that mobile terminal 500 may have one or more additional components, such as hardware, software, or firmware elements. For example, mobile terminal 500 may also include various additional components including processors, microprocessors, at least one memory component, subscriber identity module(s) (SIM), at least one power supply, peripheral device(s) and other specialty or generic hardware, processors, or circuits, etc., in order to support a variety of additional operations. The at least one memory component of mobile terminal 500 may be configured to store program instructions. The mobile terminal 500 may have a non-transitory computer readable medium for storing program instructions for causing a processor to execute the program instructions. Mobile terminal 500 may also include a variety of user input/output devices, such as display(s), keypad(s), touchscreen(s), speaker(s), microphone(s), button(s), camera(s), etc.

In an overview of the operation of mobile terminal 500, mobile terminal 500 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission. Alternatively, one or more components of mobile terminal 500 may be shared between different wireless access protocols, such as, for example, by sharing an antenna 502 between multiple different wireless access protocols or RATs. In an exemplary aspect of this disclosure, RF unit 504 and/or baseband modem 506 may operate according to multiple communication access protocols (i.e. "multi-mode"), and thus may be configured to support one or more of LTE, GSM, and/or UMTS access protocols.

Furthermore, RF unit 504 may receive frequency wireless signals via antenna 502, which may be implemented as, for example, a single antenna or an antenna array composed of multiple antennas. RF unit 504 may include various reception circuitry elements, for example, analog circuitry configured to process externally received signals, such as circuitry to convert externally received RF signals to baseband and/or intermediate frequencies. RF unit 504 may also include amplification circuitry to amplify externally received signals, such power amplifiers and/or Low Noise Amplifies, although it is appreciated that such components may also implemented separately. RF unit 504 may additionally include various transmission circuit elements configured to transmit signals, such as, for example, baseband and/or intermediate frequency signals provided by the baseband modem 506, which may include mixing circuitry to modulate signals onto one or more radio frequency carrier waves and/or amplification circuitry to amplify internal signals before transmission. The RF unit 504 may provide such signals to antenna 502 for wireless transmission. Although not explicitly depicted in FIG. 5, RF unit 504 may be additionally connected to application processor 508.

Baseband modem 506 may include digital processing circuit(s) and a baseband memory, and may include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 506 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 506 and may also be partially or fully integrated with the digital processing circuitry.

The baseband modem 506 may be configured to operate one or more protocol stacks, such as a GSM protocol stack, an LTE protocol stack, a UMTS protocol stack, etc. or any combination thereof. Baseband modem 506 may be multi-mode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The baseband modem 506 may be configured to control one or more further components of mobile terminal 500. The protocol stack(s) of baseband modem 506 may be configured to control operation of the baseband modem 506, such as in order to transmit and receive mobile communication in accordance with the corresponding RAT(s).

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 506 may be detailed herein substantially in terms of functional operation in recognition that a person of skill in the art may readily appreciate the various possible structural realizations of baseband modem 506 using digital processing circuitry that will provide the desired functionality.

In an exemplary aspect of the disclosure, the baseband modem is configured to: detect a plurality of pending transactions to be conducted on a second RAT when the mobile terminal (i.e. UE) is on a first RAT; switch the UE from the first RAT to the second RAT; conduct the plurality of pending transactions on the second RAT; and implement a restriction on switching back to the first RAT for at least the duration of said conducting of the plurality of pending transactions on the second RAT.

The baseband modem may be further configured to: detect a plurality of pending transactions on the second RAT; switch the communication device from the first RAT to the second RAT; determine at least one subset within the plurality of pending transactions, wherein the at least one subset comprises multiple pending transactions; conducting the at least one subset on the second RAT; and implement a restriction on switching back to the first RAT for at least the duration of said conducting at least one subset on the second RAT.

The application processor 508 may be implemented as a Central Processing Unit (CPU), and may function as a controller of mobile terminal 500. The application processor 508 may be configured to execute various applications and/or programs of mobile terminal 500, such as, for example, applications corresponding to program code stored in a memory component of mobile terminal 500 (not shown in FIG. 5). The application processor 508 may also be configured to control one or more further components of mobile terminal 500, such as, for example, input/output devices (e.g. display(s), keypad(s), touchscreen(s), speaker(s), microphone(s), button(s), etc.) peripheral devices, a memory, power supplies, external device interfaces, etc.

Although the baseband modem 506 and application processor 508 are depicted separately in FIG. 5, it is appreciated that the figure is not limiting in nature. It is understood that the baseband modem 506 and the application processor 508 may be implemented separately, implemented together (i.e. as an integrated unit), partially implemented together, etc.

Figure 6:
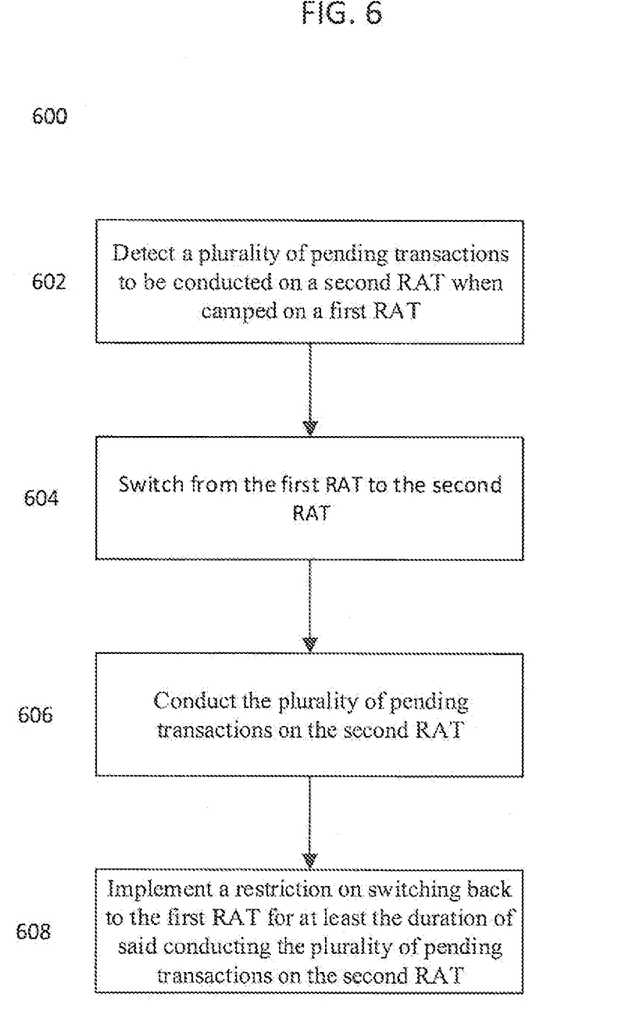
FIG. 6 is an exemplary flowchart in an aspect of this disclosure.

FIG. 6 shows a flowchart 600 in an aspect of this disclosure. It is appreciated that flowchart 600 is exemplary in nature and may thus be simplified for purposes of explanation.

The communication device detects a plurality of pending transaction to be conducted on a second RAT when the device is camped on the first RAT 602. These pending transactions may be transmissions and/or receptions (i.e. downloads). Then, the switch is made from the first RAT to the second RAT 604, where the plurality of pending transactions on the second RAT is conducted 606. In 608, the device implements a restriction on switching back to the first RAT for at least the duration of said conducting the plurality of transaction on the second RAT during 606. In other words, 608 is effective for at least the duration that 606 takes place.

In Example 1, a method for a communication device to perform a switch from a first radio access technology (RAT) to a second RAT on a network, comprising: detecting a plurality of pending transactions to be conducted on the second RAT; switching from the first RAT to the second RAT; conducting the plurality of pending transactions on the second RAT; and implementing a restriction on returning to the first RAT while the plurality of pending transactions is conducted on the second RAT.

In Example 2, the subject matter of example 1, further comprising returning to the first RAT.

In Example 3, the subject matter of any one of examples 1-2, further comprising wherein the first RAT supports packet switching (PS).

In Example 4, the subject matter of example 3, further comprising wherein the first RAT is a long term evolution (LTE) RAT.

In Example 5, the subject matter of any one of examples 1-4, further comprising wherein the second RAT supports circuit switching (CS).

In Example 6, the subject matter of example 5, further comprising wherein the second RAT is a Universal Mobile Telecommunications System (UMTS) RAT.

In Example 7, the subject matter of example 5, further comprising wherein the second RAT is a Global System for Mobile Communications (GSM) RAT.

In Example 8, the subject matter of any one of examples 1-7, further comprising wherein the plurality of pending transactions comprise at least one of a supplementary service (SS) data, or an unstructured supplementary service data (USSD).

In Example 9, the subject matter of any one of examples 1-8, further comprising wherein the plurality of pending transactions comprise pending transmissions.

In Example 10, the subject matter of any one of examples 1-8, further comprising wherein the plurality of pending transactions comprise pending receptions.

In Example 11, the subject matter of any one of examples 1-10, further comprising detecting the plurality of pending transactions by an application (AP) protocol layer or a non-access stratum (NAS) connection management (CM) protocol layer of the communication device.

In Example 12, the subject matter of any one of examples 1-11, further comprising implementing the restriction on returning to the first RAT by the NAS mobility management (MM) protocol layer of the communication device.

In Example 13, the subject matter of any one of examples 1-12, further comprising implementing the restriction on returning to the first RAT comprises suppressing a timer to delay a radio resource control (RRC) connection release.

In Example 14, the subject matter of example 13, further comprising wherein the NAS MM suppresses the timer.

In Example 15, the subject matter of any one of examples 13-14, the timer comprising a T3340 timer.

In Example 16, the subject matter of any one of examples 13-15, further comprising ignoring the Redirection to LTE received in the RRC connection release.

In Example 17, the subject matter of any one of examples 16, further comprising an Access Stratum (AS) protocol layer ignoring the Redirection to LTE received in the RRC connection release.

In Example 18, a method for a communication device to perform a switch from a first radio access technology (RAT) to a second RAT on a network, comprising: detecting a plurality of pending transactions to be conducted on the second RAT; switching from the first RAT to the second RAT; determining a subset of pending transactions within the plurality of pending transactions; conducting the subset of pending transactions on the second RAT; and implementing a restriction on returning to the first RAT while the subset of pending transactions is conducted on the second RAT.

In Example 19, the subject matter of example 18, further comprising returning to the first RAT.

In Example 20, the subject matter of any one of examples 18-19, further comprising wherein the first RAT supports packet switching (PS).

In Example 21, the subject matter of example 20, further comprising that the first RAT is a long term evolution (LTE) RAT.

In Example 22, the subject matter of any one of examples 18-21, further comprising wherein the second RAT supports circuit switching (CS).

In Example 23, the subject matter of example 22, further comprising wherein the second RAT is a Universal Mobile Telecommunications System (UMTS) RAT.

In Example 24, the subject matter of example 22, further comprising wherein the second RAT is a Global System for Mobile Communications (GSM) RAT.

In Example 25, the subject matter of any one of examples 18-24, further comprising wherein the plurality of pending transactions comprise at least one of a supplementary service (SS) data or an unstructured supplementary service data (USSD).

In Example 26, the subject matter of any one of examples 18-25, further comprising wherein the subset of pending transactions comprises at least one of a supplementary service (SS) data or an unstructured supplementary service data (USSD).

In Example 27, the subject matter of any one of examples 18-26, further comprising wherein the plurality of pending transactions comprise pending transmissions.

In Example 28, the subject matter of any one of examples 18-26, further comprising wherein the plurality of pending transactions comprise pending receptions.

In Example 29, the subject matter of any one of examples 18-28, further comprising detecting the plurality of pending transactions by an application (AP) protocol layer or a non-access stratum (NAS) connection management (CM) protocol layer of the communication device.

In Example 30, the subject matter of any one of examples 18-29, further comprising implementing the restriction on returning to the first RAT by the NAS mobility management (MM) protocol layer of the communication device.

In Example 31, the subject matter of any one of examples 18-30, further comprising implementing the restriction on returning to the first RAT comprises suppressing a timer to delay a radio resource control (RRC) connection release.

In Example 32, the subject matter of example 31, further comprising wherein the NAS MM suppresses the timer.

In Example 33, the subject matter of any one of examples 31-32, the timer comprising a T3340 timer.

In Example 34, the subject matter of any one of examples 31-33, further comprising ignoring the Redirection to LTE received in the RRC connection release.

In Example 35, the subject matter of example 34, further comprising an Access Stratum (AS) protocol layer ignoring the Redirection to LTE received in the RRC connection release.

In Example 36, a communication device configured to perform a switch from a first radio access technology (RAT) to a second RAT on a network, comprising: a radio frequency (RF) unit configured to communicate with the network via the first RAT and the second RAT; a baseband modem configured to: detect a plurality of pending transactions to be conducted on the second RAT; switch the communication device from the first RAT to the second RAT; conduct the plurality of pending transactions on the second RAT; and implement a restriction on returning to the first RAT while the plurality of pending transactions is conducted on the second RAT.

In Example 37, the subject matter of example 36, the baseband modem further configured to return the communication device to the first RAT.

In Example 38, the subject matter of any one of examples 36-37, wherein the first RAT supports packet switching (PS).

In Example 39, the subject matter of example 38, wherein the first RAT is a long term evolution (LTE) RAT.

In Example 40, the subject matter of any one of examples 36-39, wherein the second RAT supports circuit switching (CS).

In Example 41, the subject matter of example 40, wherein the second RAT is a Universal Mobile Telecommunications System (UMTS) RAT.

In Example 42, the subject matter of example 40, wherein the second RAT is a Global System for Mobile Communications (GSM) RAT.

In Example 43, the subject matter of any one of examples 36-42, wherein the plurality of pending transactions comprise at least one of a supplementary service (SS) data or an unstructured supplementary service data (USSD).

In Example 44, the subject matter of any one of examples 36-43, the baseband modem further configured to detect the plurality of pending transactions comprise pending transmissions.

In Example 45, the subject matter of any one of examples 36-43, the baseband modem further configured to detect the plurality of pending transactions comprise pending receptions.

In Example 46, the subject matter of any one of examples 36-45, wherein the baseband modem is further configured to detect the plurality of pending transactions with an application (AP) protocol layer or a non-access stratum (NAS) connection management (CM) protocol layer.

In Example 47, the subject matter of any one of examples 36-46, wherein the baseband modem is further configured to implement the restriction on returning to the first RAT with the NAS mobility management (MM) protocol layer.

In Example 48, the subject matter of any one of examples 36-47, wherein the baseband modem is further configured to implement the restriction on returning to the first RAT by suppressing a timer to delay a radio resource control (RRC) connection release.

In Example 49, the subject matter of example 48, wherein the baseband modem is further configured to suppress the timer by the NAS MM protocol layer.

In Example 50, the subject matter of any one of examples 48-49, the timer comprising a T3340 timer.

In Example 51, the subject matter of any one of examples 48-50, wherein the baseband modem is further configured to ignore the Redirection to LTE received in the RRC connection release.

In Example 52, the subject matter of example 51, wherein the baseband modem is further configured to further to ignore the Redirection to LTE received in the RRC connection release with an Access Stratum (AS) protocol layer.

In Example 53, a communication device configured to perform a switch from a first radio access technology (RAT) to a second RAT on a network, comprising: a radio frequency (RF) unit configured to communicate with the network via the first RAT and the second RAT; a baseband modem configured to: detect a plurality of pending transactions to be conducted on the second RAT; switch the communication device from the first RAT to the second RAT; determine a subset of pending transactions within the plurality of pending transactions; conducting the subset of pending transactions on the second RAT; and implement a restriction on returning to the first RAT while the subset of pending transactions is conducted on the second RAT.

In Example 54, the subject matter of example 53, the baseband modem further configured return the communication device to the first RAT.

In Example 55, the subject matter of any one of examples 53-54, wherein the first RAT supports packet switching (PS).

In Example 56, the subject matter of example 55, wherein the first RAT is a long term evolution (LTE) RAT.

In Example 57, the subject matter of any one of examples 53-56, wherein the second RAT supports circuit switching (CS).

In Example 58, the subject matter of example 57, wherein the second RAT is a Universal Mobile Telecommunications System (UMTS) RAT.

In Example 59, the subject matter of example 57, wherein the second RAT is a Global System for Mobile Communications (GSM) RAT.

In Example 60, the subject matter of any one of examples 53-59, wherein the plurality of pending transactions comprise at least one of a supplementary service (SS) data or an unstructured supplementary service data (USSD).

In Example 61, the subject matter of any one of examples 53-60, the baseband modem further configured to detect the plurality of pending transactions comprise pending transmissions.

In Example 62, the subject matter of any one of examples 53-60, the baseband modem further configured to detect the plurality of pending transactions comprise pending receptions.

In Example 63, the subject matter of any one of examples 53-62, wherein the baseband modem is further configured to detect the plurality of pending transactions with an application (AP) protocol layer or a non-access stratum (NAS) connection management (CM) protocol layer.

In Example 64, the subject matter of any one of examples 53-63, wherein the baseband modem is further configured to implement the restriction on returning to the first RAT with the NAS mobility management (MM) protocol layer.

In Example 65, the subject matter of any one of examples 53-64, wherein the baseband modem is further configured to implement the restriction on returning to the first RAT by suppressing a timer to delay a radio resource control (RRC) connection release.

In Example 66, the subject matter of example 65, wherein the baseband modem is further configured to suppress the timer with the NAS MM protocol layer.

In Example 67, the subject matter of any one of examples 65-66, the timer comprising a T3340 timer.

In Example 68, the subject matter of any one of examples 65-67, wherein the baseband modem is further configured to ignore the Redirection to LTE received in the RRC connection release.

In Example 69, the subject matter of example 68, wherein the baseband modem is further configured to further to ignore the Redirection to LTE received in the RRC connection release with an Access Stratum (AS) protocol layer.

In Example 70, a non-transitory computer readable medium with program instructions to cause a communication device to switch from a first radio access technology (RAT) to a second RAT, comprising: detecting a plurality of pending transactions to be conducted on the second RAT; switching from the first RAT to the second RAT; conducting the plurality of pending transactions on the second RAT; and implementing a restriction on returning to the first RAT while the plurality of pending transactions is conducted on the second RAT.

In Example 71, the subject matter of example 70, further comprising returning to the first RAT.

In Example 72, the subject matter of any one of examples 70-71, further comprising wherein the first RAT supports packet switching (PS).

In Example 73, the subject matter of example 72 further comprising wherein the first RAT is a long term evolution (LTE) RAT.

In Example 74, the subject matter of any one of examples 70-73, further comprising wherein the second RAT supports circuit switching (CS).

In Example 75, the subject matter of example 74, further comprising wherein the second RAT is a Universal Mobile Telecommunications System (UMTS) RAT.

In Example 76, the subject matter of example 74, further comprising wherein the second RAT is a Global System for Mobile Communications (GSM) RAT.

In Example 77, the subject matter of any one of examples 70-76, further comprising wherein the plurality of pending transactions comprise at least one of a supplementary service (SS) data or an unstructured supplementary service data (USSD).

In Example 78, the subject matter of any one of examples 70-77, further comprising wherein the plurality of pending transactions comprise pending transmissions.

In Example 79, the subject matter of any one of examples 70-77, further comprising wherein the plurality of pending transactions comprise pending receptions.

In Example 80, the subject matter of any one of examples 70-79, further comprising detecting the plurality of pending transactions by an application (AP) protocol layer or a non-access stratum (NAS) connection management (CM) protocol layer of the communication device.

In Example 81, the subject matter of any one of examples 70-80, further comprising implementing the restriction on returning to the first RAT by the NAS mobility management (MM) protocol layer of the communication device.

In Example 82, the subject matter of any one of examples 70-81, further comprising implementing the restriction on returning to the first RAT comprises suppressing a timer to delay a radio resource control (RRC) connection release.

In Example 83, the subject matter of example 82, further comprising wherein the NAS MM suppresses the timer.

In Example 84, the subject matter of any one of examples 82-83, the timer comprising a T3340 timer.

In Example 85, the subject matter of any one of examples 82-84, further comprising ignoring the Redirection to LTE received in the RRC connection release.

In Example 86, the subject matter of example 85, further comprising an Access Stratum (AS) protocol layer ignores the Redirection to LTE received in the RRC connection release.

In Example 87, a non-transitory computer readable medium with program instructions to cause a communication device to switch from a first radio access technology (RAT) to a second RAT, comprising: detecting a plurality of pending transactions to be conducted on the second RAT; switching from the first RAT to the second RAT; determining a subset of pending transactions within the plurality of pending transactions; conducting the subset of pending transactions on the second RAT; and implementing a restriction on returning to the first RAT while the subset of pending transactions is conducted on the second RAT.

In Example 88, the subject matter of example 87, further comprising returning to the first RAT.

In Example 89, the subject matter of any one of examples 87-88, further comprising wherein the first RAT supports packet switching (PS).

In Example 90, the subject matter of example 89, further comprising that the first RAT is a long term evolution (LTE) RAT.

In Example 91, the subject matter of any one of examples 87-90, further comprising wherein the second RAT supports circuit switching (CS).

In Example 92, the subject matter of example 91, further comprising wherein the second RAT is a Universal Mobile Telecommunications System (UMTS) RAT.

In Example 93, the subject matter of example 91, further comprising wherein the second RAT is a Global System for Mobile Communications (GSM) RAT.

In Example 94, the subject matter of any one of examples 87-93, further comprising wherein the plurality of pending transactions comprise at least one of a supplementary service (SS) data or an unstructured supplementary service data (USSD).

In Example 95, the subject matter of any one of examples 87-94, further comprising wherein the plurality of pending transactions comprise pending transmissions.

In Example 96, the subject matter of any one of examples 87-94, further comprising wherein the plurality of pending transactions comprise pending receptions.

In Example 97, the subject matter of any one of examples 87-96, further comprising wherein the subset of pending transactions comprises at least one of a supplementary service (SS) data or an unstructured supplementary service data (USSD).

In Example 98, the subject matter of any one of examples 87-97, further comprising detecting the plurality of pending transactions by an application (AP) protocol layer or a non-access stratum (NAS) connection management (CM) protocol layer of the communication device.

In Example 99, the subject matter of any one of examples 87-98, further comprising implementing the restriction on returning to the first RAT by the NAS mobility management (MM) protocol layer of the communication device.

In Example 100, the subject matter of any one of examples 87-99, further comprising implementing the restriction on returning to the first RAT comprises suppressing a timer to delay a radio resource control (RRC) connection release.

In Example 101, the subject matter of example 100, further comprising wherein the NAS MM suppresses the timer.

In Example 102, the subject matter of any one of examples 100-101, the timer comprising a T3340 timer.

In Example 103, the subject matter of any one of examples 100-102, further comprising ignoring the Redirection to LTE received in the RRC connection release.

In Example 104, the subject matter of example 103, further comprising an Access Stratum (AS) protocol layer ignoring the Redirection to LTE received in the RRC connection release.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device configured to perform a switch from a first radio access technology (RAT) to a second RAT on a network, comprising:
   a radio frequency (RF) unit configured to communicate with the network via the first RAT and the second RAT;
   a baseband modem configured to:
     detect a plurality of pending transactions to be conducted on the second RAT;
     switch the communication device from the first RAT to the second RAT;

conduct the plurality of pending transactions on the second RAT;
and
implement a restriction on returning to the first RAT while the plurality of pending transactions is conducted on the second RAT;
wherein the restriction on returning to the first RAT is implemented by suppressing a timer to delay a radio resource control (RRC) connection release.

2. The communication device of claim 1, the baseband modem further configured to return the communication device to the first RAT.

3. The communication device of claim 1, wherein the first RAT supports packet switching (PS).

4. The communication device of claim 1, wherein the second RAT supports circuit switching (CS).

5. The communication device of claim 1, wherein the plurality of pending transactions comprise at least one of a supplementary service (SS) data or an unstructured supplementary service data (USSD).

6. The communication device of claim 1, wherein the baseband modem is further configured to detect the plurality of pending transactions with an application (AP) protocol layer or a non-access stratum (NAS) connection management (CM) protocol layer.

7. The communication device of claim 1, wherein the baseband modem is further configured to implement the restriction on returning to the first RAT with the NAS mobility management (MM) protocol layer.

8. The communication device of claim 1, wherein the baseband modem is further configured to ignore the Redirection to LTE received in the radio resource control (RRC) connection release.

9. A communication device configured to perform a switch from a first radio access technology (RAT) to a second RAT on a network, comprising:
a radio frequency (RF) unit configured to communicate with the network via the first RAT and the second RAT;
a baseband modem configured to:
detect a plurality of pending transactions to be conducted on the second RAT;
switch the communication device from the first RAT to the second RAT;
determine a subset of pending transactions within the plurality of pending transactions;
conduct the subset of pending transactions on the second RAT; and
implement a restriction on returning to the first RAT while the subset of pending transactions is conducted on the second RAT;
wherein the restriction on returning to the first RAT is implemented by suppressing a timer to delay a radio resource control (RRC) connection release.

10. The communication device of claim 9, the baseband modem further configured return the communication device to the first RAT.

11. The communication device of claim 9, wherein the baseband modem is further configured to detect the plurality of pending transactions with an application (AP) protocol layer or a non-access stratum (NAS) connection management (CM) protocol layer.

12. The communication device of claim 9, wherein the baseband modem is further configured to implement the restriction on returning to the first RAT with the NAS mobility management (MM) protocol layer.

13. A method for a communication device to perform a switch from a first radio access technology (RAT) to a second RAT on a network, comprising:
detecting a plurality of pending transactions to be conducted on the second RAT;
switching from the first RAT to the second RAT;
conducting the plurality of pending transactions on the second RAT;
implementing a restriction on returning to the first RAT while the plurality of pending transactions is conducted on the second RAT; wherein the implementing the restriction on returning to the first RAT occurs by suppressing a timer to delay a radio resource control (RRC) connection release.

14. The method of claim 13, further comprising returning to the first RAT.

15. The method of claim 13, further comprising wherein the first RAT supports packet switching (PS).

16. The method of claim 13, further comprising wherein the second RAT supports circuit switching (CS).

17. The method of claim 13, further comprising wherein the plurality of pending transactions comprise at least one of a supplementary service (SS) data, or an unstructured supplementary service data (USSD).

18. The method of claim 13, further comprising implementing the restriction on returning to the first RAT by the NAS mobility management (MM) protocol layer of the communication device.

19. A non-transitory computer readable medium with program instructions to cause a communication device to switch from a first radio access technology (RAT) to a second RAT, comprising:
detecting a plurality of pending transactions to be conducted on the second RAT;
switching from the first RAT to the second RAT;
conducting the plurality of pending transactions on the second RAT; and
implementing a restriction on returning to the first RAT while the plurality of pending transactions is conducted on the second RAT; wherein the implementing the restriction on returning to the first RAT occurs by suppressing a timer to delay a radio resource control (RRC) connection release.

20. The non-transitory computer readable medium of claim 19, further comprising returning to the first RAT.

\* \* \* \* \*